(12) United States Patent
Barrows

(10) Patent No.: US 10,208,733 B2
(45) Date of Patent: Feb. 19, 2019

(54) TANDEM TIP-JOINED ROTOR BLADE AND HUB COUPLING FOR PASSIVE PITCH ANGLE CONTROL

(71) Applicant: Michael L Barrows, Newport News, VA (US)

(72) Inventor: Michael L Barrows, Newport News, VA (US)

( * ) Notice: Subject to any disclaimer, the term of this patent is extended or adjusted under 35 U.S.C. 154(b) by 448 days.

(21) Appl. No.: 15/213,429

(22) Filed: Jul. 19, 2016

(65) Prior Publication Data

US 2018/0023546 A1 Jan. 25, 2018

(51) Int. Cl.
| F03D 1/06 | (2006.01) |
| F03D 13/20 | (2016.01) |
| F03D 7/02 | (2006.01) |

(52) U.S. Cl.
CPC ......... *F03D 1/0675* (2013.01); *F03D 1/0633* (2013.01); *F03D 7/0224* (2013.01); *F03D 7/0256* (2013.01); *F03D 7/0296* (2013.01); *F03D 13/22* (2016.05); *F05B 2220/30* (2013.01); *F05B 2240/221* (2013.01); *F05B 2240/912* (2013.01)

(58) Field of Classification Search
CPC ...... F03D 1/0675; F03D 13/22; F03D 1/0633; F03D 7/0224; F03D 7/0256; F03D 7/0296; F03D 7/0232; F03D 7/0252; F03D 1/0658; F05B 2220/30; F05B 2240/221; F05B 2240/912; F01D 5/146
USPC ..................................................... 416/227 R
See application file for complete search history.

(56) References Cited

U.S. PATENT DOCUMENTS

| 4,102,600 A * | 7/1978 | Schwab | F01D 5/145 416/231 R |
| 7,448,337 B1 * | 11/2008 | King | F03D 1/0633 114/102.1 |
| 8,011,887 B2 * | 9/2011 | Fisher | F03D 1/0641 416/23 |
| 8,647,063 B2 * | 2/2014 | Koike | F03D 1/0675 416/223 R |
| 8,747,067 B2 * | 6/2014 | Barban | F03D 1/0633 415/4.3 |
| 8,747,070 B2 * | 6/2014 | Blonder | F03D 5/00 416/117 |
| 8,834,127 B2 * | 9/2014 | Giguere | F03D 1/0633 416/228 |

(Continued)

FOREIGN PATENT DOCUMENTS

| DE | 202012005356 U1 * | 7/2012 | ......... F03D 1/0641 |
| DE | 102015011260 A1 * | 3/2017 | ............. F03D 1/025 |
| WO | WO-2010053450 A2 * | 5/2010 | ........... F03D 1/0608 |

*Primary Examiner* — Jason D Shanske
*Assistant Examiner* — Brian Christopher Delrue
(74) *Attorney, Agent, or Firm* — Peter J. Van Bergen

(57) ABSTRACT

A rotor blade system includes a hub for rotational movement in a defined direction of rotation. A first airfoil having a quarter-chord defined along a span thereof is coupled to the hub, but is uncoupled from the rotational movement of the hub. A second airfoil having a quarter-chord defined along a span thereof is coupled to the hub for rotation in direct correspondence with the rotational movement of the hub. The quarter-chord of the first airfoil leads the quarter-chord of the second airfoil when the hub experiences its rotational movement in the defined direction of rotation. A connector couples the tip of the first airfoil to the tip of the second airfoil.

17 Claims, 4 Drawing Sheets

(56) References Cited

U.S. PATENT DOCUMENTS

| | | | | |
|---|---|---|---|---|
| 8,985,947 B2* | 3/2015 | Obrecht | | F03D 1/0683 |
| | | | | 416/244 R |
| 9,228,564 B2* | 1/2016 | Wirz | | F03D 1/0675 |
| 9,989,033 B2* | 6/2018 | Syrovy | | F03B 17/061 |
| 10,094,358 B2* | 10/2018 | Hokelek | | F03D 1/0633 |
| 2001/0004439 A1* | 6/2001 | Bolcich | | F03D 1/025 |
| | | | | 416/9 |
| 2002/0040948 A1* | 4/2002 | Ragner | | A63H 27/002 |
| | | | | 244/153 R |
| 2007/0297903 A1* | 12/2007 | Morris | | F03B 17/06 |
| | | | | 416/132 A |
| 2009/0322095 A1* | 12/2009 | Mazur | | F03D 3/0418 |
| | | | | 290/55 |
| 2010/0233919 A1* | 9/2010 | Ersoy | | B63H 9/02 |
| | | | | 440/8 |
| 2011/0142636 A1* | 6/2011 | Curtin | | F03D 1/0658 |
| | | | | 416/62 |
| 2011/0142676 A1* | 6/2011 | Mohammed | | F03D 1/0633 |
| | | | | 416/241 R |
| 2011/0309633 A1* | 12/2011 | Padlo | | F03D 1/0633 |
| | | | | 290/55 |
| 2012/0027595 A1* | 2/2012 | Pesetsky | | F03D 1/0633 |
| | | | | 416/147 |
| 2012/0217754 A1* | 8/2012 | Fukami | | F03D 1/0633 |
| | | | | 290/55 |
| 2014/0127030 A1* | 5/2014 | Smyth | | F03D 1/025 |
| | | | | 416/237 |
| 2014/0133992 A1* | 5/2014 | Brooks | | F03D 1/0608 |
| | | | | 416/220 R |
| 2014/0271216 A1* | 9/2014 | Syrovy | | F03B 17/061 |
| | | | | 416/224 |
| 2015/0048215 A1* | 2/2015 | McGinnis | | B64C 9/00 |
| | | | | 244/90 R |
| 2015/0192105 A1* | 7/2015 | Chu | | F03D 3/061 |
| | | | | 416/119 |
| 2015/0211482 A1* | 7/2015 | Radisek | | F03D 3/061 |
| | | | | 416/135 |
| 2015/0275856 A1* | 10/2015 | Tahar | | F03D 1/0633 |
| | | | | 416/131 |
| 2017/0137116 A1* | 5/2017 | Ireland | | B64C 23/06 |
| 2017/0284363 A1* | 10/2017 | Harrison | | F03D 1/0675 |
| 2018/0038341 A1* | 2/2018 | Fukami | | F03D 9/25 |
| 2018/0045175 A1* | 2/2018 | Savedra Pacheco | | |
| | | | | F03D 1/0633 |

* cited by examiner

TANDEM TIP-JOINED ROTOR BLADE AND HUB COUPLING FOR PASSIVE PITCH ANGLE CONTROL

FIELD OF THE INVENTION

The invention relates generally to rotor blades, and more particularly to a tandem tip-joined blade coupled to a rotor's hub for passive pitch angle control of the blade.

BACKGROUND OF THE INVENTION

Rotor blade systems provide lift and/or propulsion for a variety of aircraft (e.g., planes, helicopters, etc.). Rotor blade systems are also an integral part of wind turbine generators where rotor blades coupled to a tower-mounted hub are designed to convert wind energy into rotational energy to drive a turbine coupled to the tower-mounted hub to thereby generate electrical energy.

In terms of horizontal-axis wind turbines, rotor blades generally rotate in a stationary plane that is approximately perpendicular to a ground surface above which the rotor blades are deployed. The rotor blades of a wind turbine span large distances on the order of 40-50 meters. For efficient energy generation, these large spanning blades need to generate as much rotational torque as possible for a variety of wind conditions. To make this result possible, the pitch angle of a wind turbine's rotor blades should be adjusted for aerodynamic efficiently as each rotor blade traverses each rotation about its hub. While the pitch angle of rotor blades can be adjusted by active devices coupled to a rotor blade, the use of such active devices complicates the overall rotor blade system, adds to the weight of the rotor blades, and adds to the overall cost of the rotor blade system.

SUMMARY OF THE INVENTION

Accordingly, it is an object of the present invention to provide a rotor blade system that passively achieves pitch angle control.

Another object of the present invention is to provide a rotor blade system for use in a wind turbine.

Still another object of the present invention is to provide a wind turbine's rotor blade system that passively adapts to a variety of wind conditions to include high-wind conditions.

Other objects and advantages of the present invention will become more obvious hereinafter in the specification and drawings.

In accordance with the present invention, a rotor blade system includes a hub for rotational movement in a defined direction of rotation. A first airfoil having a quarter-chord defined along a span of the first airfoil is coupled to the hub, but is uncoupled from the rotational movement of the hub. The first airfoil terminates in a tip. A second airfoil having a quarter-chord defined along a span of the second airfoil is coupled to the hub for rotation in direct correspondence with the rotational movement of the hub. The quarter-chord of the first airfoil leads the quarter-chord of the second airfoil when the hub experiences its rotational movement in the defined direction of rotation. The second airfoil terminates in a tip. A connector couples the tip of the first airfoil to the tip of the second airfoil.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DETAILED DESCRIPTION OF THE INVENTION

Figure 1:
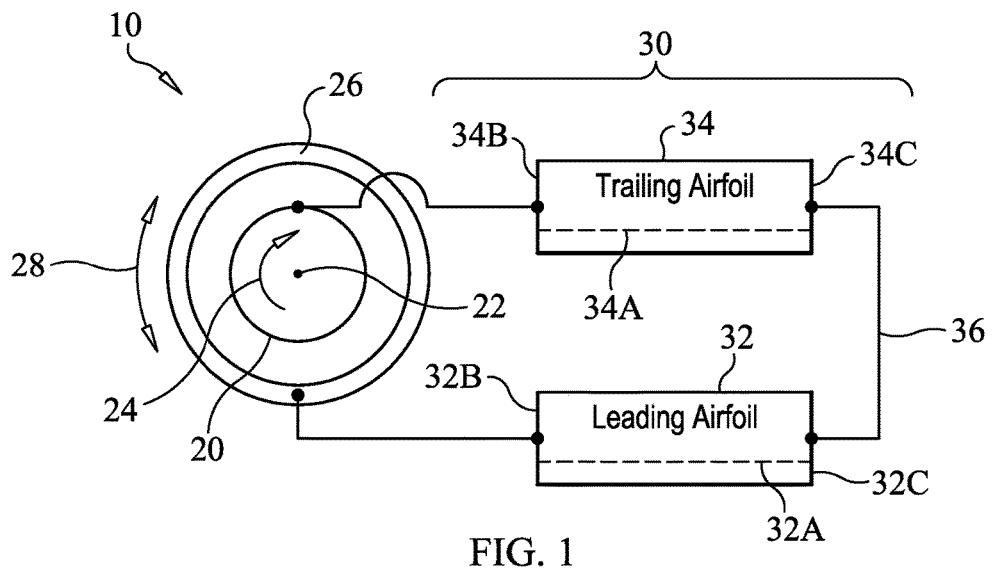
FIG. 1 is a schematic view of a rotor blade system for passive pitch angle control in accordance with an embodiment of the present invention.

Referring now to the drawings and more particularly to FIG. 1, a rotor blade system in accordance with an embodiment of the present invention is shown and is referenced generally by numeral 10. By way of an illustrative example, rotor blade system 10 will be explained for its use and inclusion in a wind turbine used to generate electrical energy as wind causes the rotor blade system to rotate. However, it is to be understood that the general principles and features of rotor blade system 10 can be applied to other rotor blade systems such as those used in aircraft where the rotor blade system would be rotated by an engine for purposes of lift and/or propulsion.

Rotor blade system 10 includes a rotatable hub 20 capable of rotation about its central axis 22. In general, hub 20 is configured to rotate in a particular or defined direction of rotation about axis 22 as indicated by arrow 24. If rotor blade system 10 is to be included as part of a wind turbine, rotatable hub 20 would be coupled to an electric generator (not shown) as would be well understood in the art. The particular design of the electric generator and any additional mechanical and/or electrical elements of such a wind turbine are not limitations of the present invention.

Coupled to hub 20 is a tandem blade 30. Although only one blade 30 is illustrated as part of rotor blade system 10, it is to be understood that more than one blade 30 can be included in a rotor blade system in accordance with the present invention. When multiple tandem blades 30 are to be coupled to hub 20, they can be evenly distributed about hub 20. The following description of a single tandem blade 30 would be the same if multiple blades were included in the rotor blade system.

Tandem blade 30 includes a leading airfoil 32 and a trailing airfoil 34 where the terms "leading" and "trailing" are defined in terms of direction of rotation 24. The particular design of each airfoil 32 and 34 is not a limitation of the present invention. As is known in the art, each airfoil 32 and 34 will have a quarter-chord point or location (or simply "quarter-chord" hereinafter) 32A and 34A, respectively, that extends along the span of the respective airfoil. In accordance with the fundamental principles of aerodynamics, an airfoil's quarter-chord is (or approximates) the aerodynamic center of an airfoil where the aerodynamic center is the point/location at which the airfoil's pitching moment coefficient does not vary with the airfoil's angle of attack. That is, the aerodynamic center of an airfoil defines the airfoil location where the incremental lift due to angle of attack will act. Since the lift force generated due to a change in angle of attack passes through an airfoil's aerodynamic center, the moment generated about the aerodynamic center is zero. In terms of the present invention, quarter-chord 32A of airfoil 32 leads quarter-chord 34A of airfoil 34 in direction of rotation 24. The offset distance "D" between quarter-chords 32A and 34A can be used to tune the performance of tandem blade 30 as will be explained further below.

Trailing airfoil 34 has its root 34B fixedly coupled to hub 20 such that rotation of hub 20 in direction of rotation 24 causes a corresponding driving rotation of trailing airfoil 34. In contrast, leading airfoil 32 has its root 32B fixedly coupled to a slip mounting 26 that is coupled to hub 20 in a way that slip mounting 26 is prevented from axial movement along hub 20 but uncoupled from the hub's rotational movement along direction of rotation 24. That is, rotation of hub 20 does not cause any direct and corresponding rotational movement of slip mounting 26 as slip mounting 26 is free to rotate about hub 20 as indicated by two-headed arrow 28 and will be referred to hereinafter as uncoupled rotational movement 28.

Figure 2:
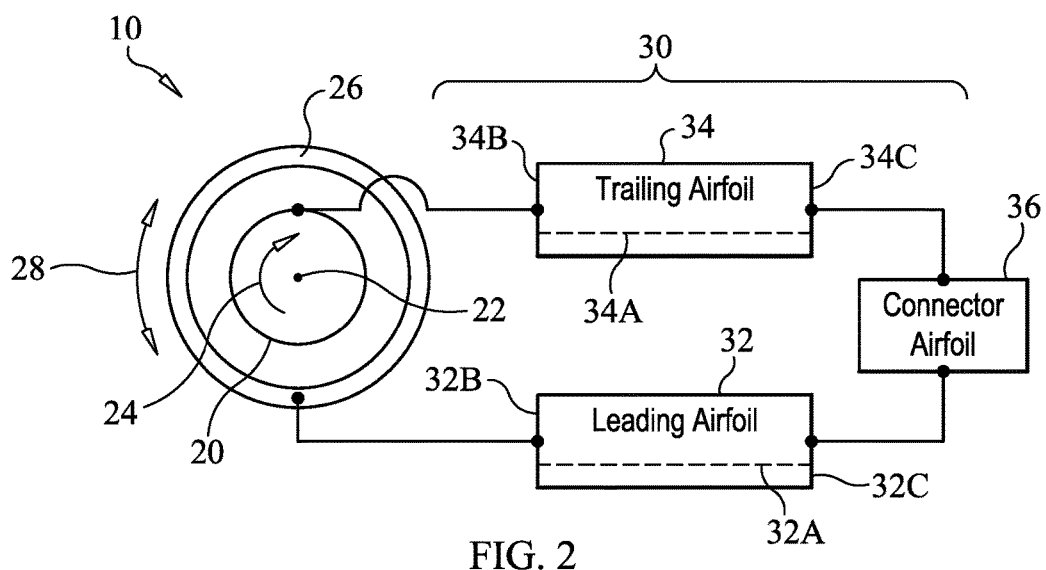
FIG. 2 is a schematic view of a rotor blade system for passive pitch angle control in accordance with an embodiment of the present invention with another embodiment of the present invention.

Each of leading airfoil 32 and trailing airfoil 34 spans to an outboard end or tip 32C and 34C, respectively. In accordance with the present invention, tips 32C and 34C are rigidly and fixedly coupled to each other in a spaced-apart fashion by a connector 36. The shape and configuration of connector 36 can be designed for a particular application and/or used for tuning the performance of blade 30. For example, connector 36 can be integrated with one or both of airfoils 32 and 34, or could be attached to airfoils 32 and 34 without departing from the scope of the present invention. Weights (not shown) could be coupled to connector 36 for purposes of fine tuning the operation of blade 30. Still further, connector 36 can be an airfoil as illustrated in FIG. 2.

Figure 3:
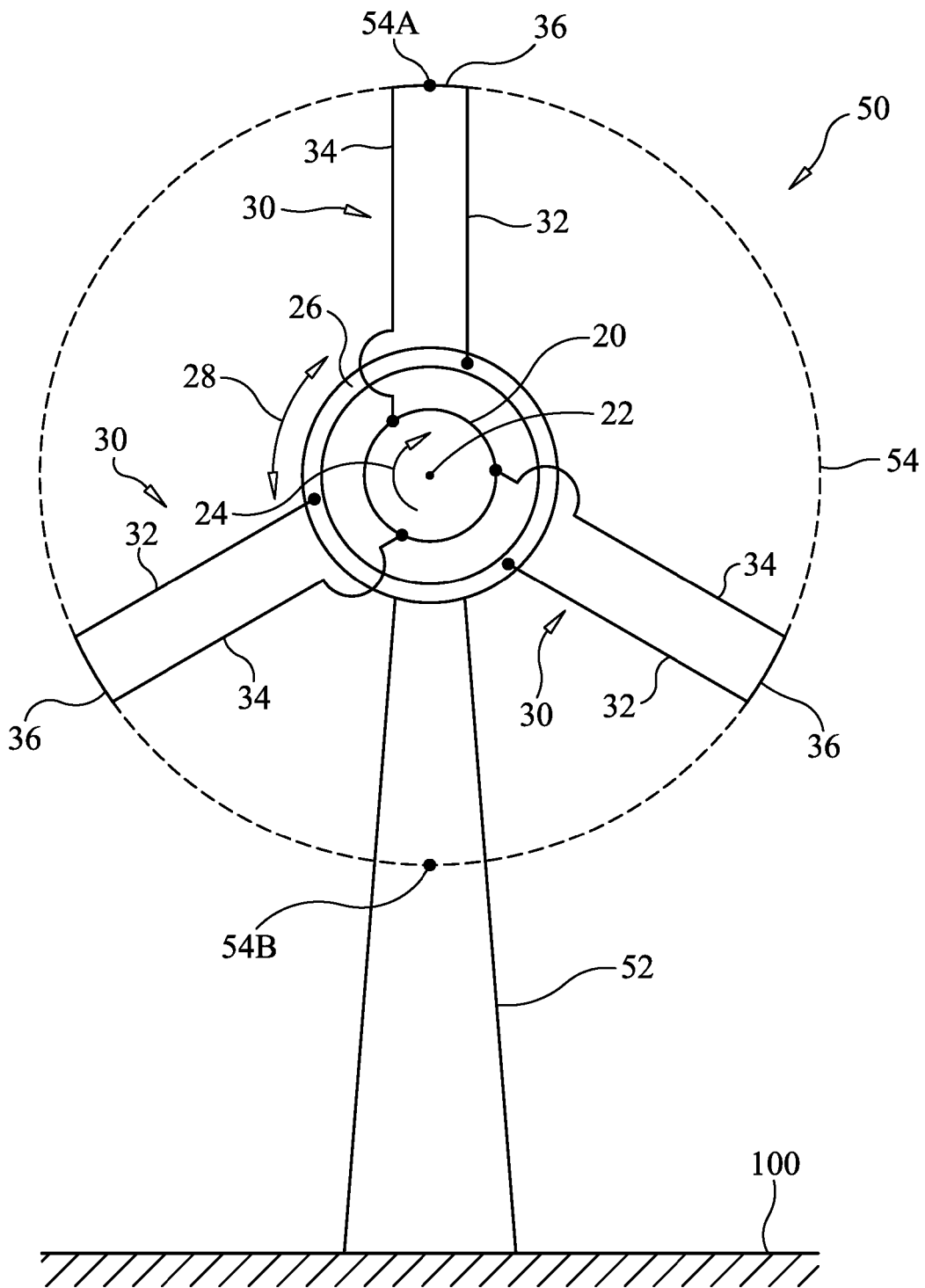
FIG. 3 is a schematic view of a rotor blade system of the present invention mounted on a tower to define a wind turbine in accordance with an embodiment of the present invention.

The above-described tandem blade and hub coupling provides passive and cyclic tip pitch control, provides passive tip stall in over-speed conditions, and reduces blade fatigue and the blade's noise signature as the tandem blade experiences rotational movement in the defined direction of rotation. In general, all of these advantages are provided as the directly hub-coupled and hub-driven trailing airfoil 34 acts as a spring relative to leading airfoil 32 that is only coupled to the rotational movement of hub 20 and trailing airfoil 34 via connector 36 (coupled to leading airfoil tip 32C). These advantages will be explained herein for a wind turbine such as the one illustrated in FIG. 3. Briefly, FIG. 3 illustrates a wind turbine 50 that includes a tower 52 mounted on a ground surface 100. Mounted on top of tower 52 is the above-described hub 20 to include slip mounting 26 coupled to a plurality of tandem blades 30 in the same fashion as described above. In the illustrated example, wind turbine 50 includes three tandem blades 30 evenly distributed about hub 20. As wind passes blades 30, the blades rotate in a plane (defined by dashed line circle 54) that is approximately perpendicular to ground surface 100 as would be understood in the art of wind turbines.

As each of blades 30 moves from the 6 o'clock position 54B to the 12 o'clock position 54A, the force of gravity acts on the tandem blade. More specifically and with continued reference to FIG. 1, because leading airfoil 32 is uncoupled from the rotational movement of hub 20, the force of gravity pushing down on leading airfoil 32 (as it travels from position 54B to position 54A) causes it to experience uncoupled rotational movement 28 to increase the angle of attack of airfoil 32 and passively achieve aerodynamic efficiency for this portion of the blade's rotation. At the same time, the coupling of leading airfoil tip 32C to trailing airfoil tip 34C flexes the tip region of trailing airfoil 34 into a similar aerodynamic efficiency. As each of blades 30 moves from position 54B to position 54A, the hub-driven trailing airfoil 34 passively controls the pitch angle of the tip region of leading airfoil 32. As a result, the tip regions of airfoils 32 and 34 are passively cycled for efficient aerodynamic operation throughout their rotational movement in plane 54.

As is known in the art, a wind turbine's greatest noise signature is generated during a blade's movement from the 12 o'clock position 54A to the 6 o'clock position 54B. However, in the present invention, the passive pitch control of each blade 30 moving from position 54A to position 54B decreases the angle of attack and reduces loads on the falling blade while it adapts to wind conditions thereby assuring an aerodynamic efficiency that reduces noise and blade fatigue. As mentioned above, the present invention also passively introduces tip stall in high wind conditions. As is known in the wind turbine art, if a wind turbine's blades are driven to an over-speed condition by high wind speeds, the wind turbine's generator can be driven to damaging rotational speeds. However, the above-described blade structure will prevent the occurrence of over-speed conditions by passively inducing a tip region stall condition where the airfoil loses lift to essentially slow down. More specifically, since leading airfoil 32 is rotationally uncoupled from hub 20, high wind conditions acting on leading airfoil 32 will cause it to achieve an angle of attack indicative of a stall condition that, in turn, is passed via connector 36 to the tip region of trailing airfoil 34. Counterweights (not shown) can be strategically placed on each blade to tune the blade for condition-specific stall criteria.

Figure 4:
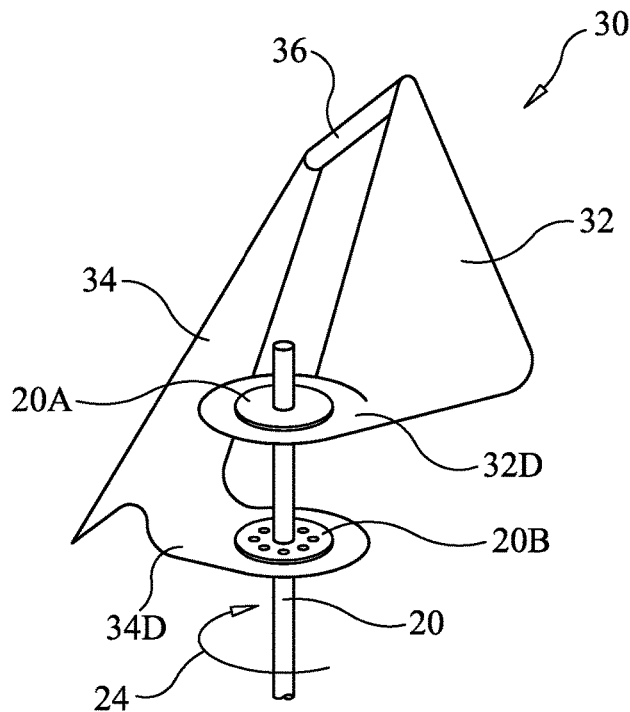
FIG. 4 is a perspective view of a single tip-joined rotor blade and hub coupling in accordance with an embodiment of the present invention.

The methods and/or apparatus used to couple leading airfoil 32 and trailing airfoil 34 to hub 20 are not limitations of the present invention. For example, FIG. 4 illustrates an embodiment of a single tandem blade 30 of the present invention coupled to hub 20. In this embodiment, leading airfoil 32 includes a dogleg-shaped paddle 32D that is coupled to a free-floating bearing 20A on hub 20 such that paddle 32D is prevented from axial movement along hub 20 while being uncoupled from rotational movement of hub 20 as described above. Trailing airfoil 34 includes a dogleg-shaped paddle 34D that is fixedly coupled to a hub mount 20B of hub 20 for corresponding rotation with hub 20 as described above. The particular shapes of paddles 32D and 34D can be used to define the offset distance D (FIG. 1) between the airfoils' quarter-chords as described above. It is to be understood that the shape of the paddles can be different from that shown without departing from the scope of the present. Still further, it is to be understood that a single paddle could be used to create the offset distance D.

Figure 5:
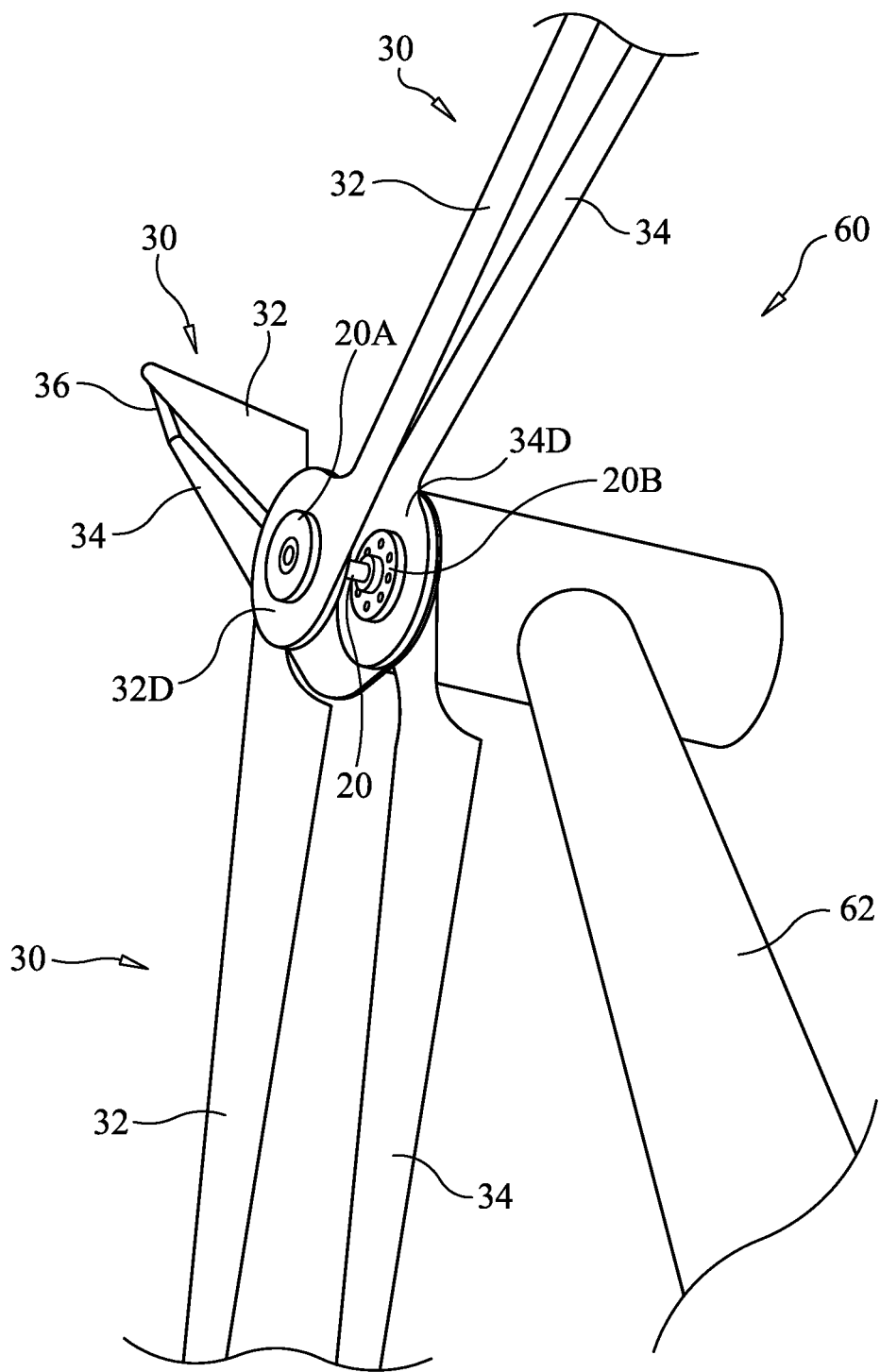
FIG. 5 is a perspective view of three tandem tip-joined rotor blades coupled to a tower-mounted hub of a wind turbine in accordance with an embodiment of the present invention.

Referring now to FIG. 5, a wind turbine 60 constructed using three of the tandem blades illustrated in FIG. 4 is shown. Briefly, hub 20 is mounted atop a tower 62. The dogleg paddles 32D of the three leading airfoils 32 are coupled to a free-floating bearing 20A, and the dogleg paddles 34D of the three trailing edge airfoils 34 are fixedly coupled to a hub mount 20B that rotates with hub 20.

Figure 6:
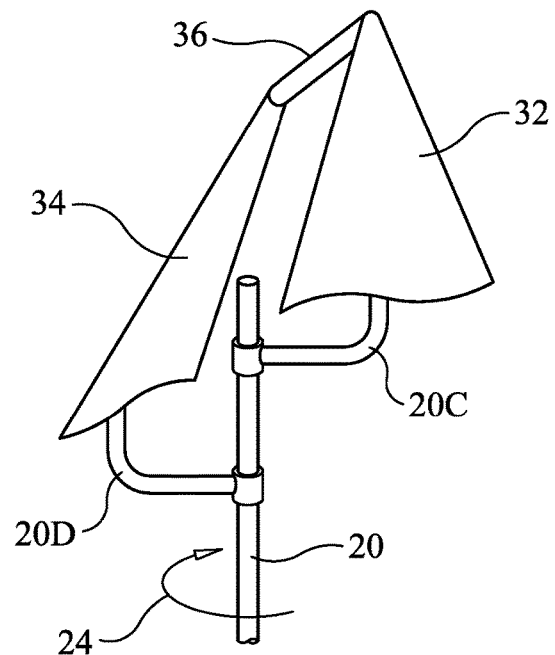
FIG. 6 is a part perspective and part schematic view of a single tandem tip-joined blade and hub coupling in accordance with another embodiment of the present invention.

The present invention is not limited to the blade-to-hub coupling described above. For example, the leading and trailing airfoils of a tandem blade could be identically constructed and the hub could be configured/constructed to provide the offset distance between the airfoils as well as the appropriate form of coupling relative to the hub's rotational movement. Accordingly, FIG. 6 illustrates another tandem blade and hub coupling contemplated by the present invention. In this embodiment, hub 20 provides a leading airfoil mounting 20C and a trailing airfoil mounting 20D. Mounting 20C is free-floating with respect to the rotational movement of hub 20 while mounting 20D is fixed to hub 20 for rotation therewith. The size and configuration of mountings 20C and 20D are used to define the offset distance between the airfoils' quarter-chords as described above.

The advantages of the present invention are numerous. The tandem tip-joined blade and hub coupling for a rotor blade system provide passive tip pitch angle control. For wind turbines, this combination improves wind turbine performance by simplifying pitch angle control, reducing complexity and cost, reducing blade fatigue and noise, and preventing turbine damage due to over-speed conditions.

Although the invention has been described relative to a specific embodiment thereof, there are numerous variations and modifications that will be readily apparent to those skilled in the art in light of the above teachings. For example, each leading airfoil and trailing airfoil can have its root region shaped/configured to allow for a greater or lesser amount of tip pitch depending on the requirements of a particular application. It is therefore to be understood that, within the scope of the appended claims, the invention may be practiced other than as specifically described.

What is claimed as new and desired to be secured by Letters Patent of the United States is:

1. A rotor blade system, comprising:
   a hub for rotational movement in a defined direction of rotation;
   a first airfoil having a quarter-chord defined along a span of said first airfoil, said first airfoil coupled to said hub but uncoupled from said rotational movement of said hub, said first airfoil having a tip;
   a second airfoil having a quarter-chord defined along a span of said second airfoil, said second airfoil coupled to said hub for rotation in direct correspondence with said rotational movement of said hub, said quarter-chord of said first airfoil leading said quarter-chord of said second airfoil when said hub experiences said rotational movement in said defined direction of rotation, said second airfoil having a tip; and
   a connector for coupling said tip of said first airfoil to said tip of said second airfoil.

2. A rotor blade system as in claim 1, further comprising a tower adapted to be fixed to a ground surface, wherein said hub is coupled to said tower, and wherein said defined direction of rotation is approximately perpendicular to the ground surface.

3. A rotor blade system as in claim 1, wherein said connector comprises a third airfoil.

4. A rotor blade system as in claim 1, wherein at least one of said first airfoil and said second airfoil includes a mounting portion for coupling to said hub, wherein each said mounting portion contributes to an airfoil offset defining an amount by which said quarter-chord of said first airfoil leads said quarter-chord of said second airfoil.

5. A rotor blade system as in claim 1, wherein said hub includes a mounting portion for coupling to said first airfoil and said second airfoil, wherein said mounting portion contributes to an airfoil offset defining an amount by which said quarter-chord of said first airfoil leads said quarter-chord of said second airfoil.

6. A rotor blade system, comprising:
   a hub for rotational movement in a defined direction of rotation; and
   a plurality of rotor blades, each of said rotor blades including
   a first airfoil having a quarter-chord defined along a span of said first airfoil, said first airfoil coupled to said hub but uncoupled from said rotational movement of said hub, said first airfoil having a tip,
   a second airfoil having a quarter-chord, said second airfoil coupled to said hub for rotation in direct correspondence to said rotational movement of said hub, said quarter-chord of said first airfoil leading said quarter-chord of said second airfoil when said hub experiences said rotational movement in said defined direction of rotation, said second airfoil having a tip, and
   a connector for coupling said tip of said first airfoil to said tip of said second airfoil.

7. A rotor blade system as in claim 6, wherein said rotor blades are evenly distributed about said hub.

8. A rotor blade system as in claim 6, further comprising a tower adapted to be fixed to a ground surface, wherein said hub is coupled to said tower, and wherein said defined direction of rotation is approximately perpendicular to the ground surface.

9. A rotor blade system as in claim 6, wherein each said connector comprises a third airfoil.

10. A rotor blade system as in claim 6 wherein, for each of said rotor blades, at least one of said first airfoil and said second airfoil includes a mounting portion for coupling to said hub, wherein each said mounting portion contributes to an airfoil offset defining an amount by which said quarter-chord of said first airfoil leads said quarter-chord of said second airfoil.

11. A rotor blade system as in claim 6, wherein said hub includes a mounting portion for coupling to said first airfoil and said second airfoil associated with each of said rotor blades, wherein said mounting portion contributes to an airfoil offset defining an amount by which said quarter-chord of said first airfoil leads said quarter-chord of said second airfoil for each of said rotor blades.

12. A rotor blade system for operation above a ground surface, comprising:
   a hub for rotational movement in a defined direction of rotation and in a plane approximately perpendicular to the ground surface; and
   a plurality of rotor blades, each of said rotor blades including
   a first airfoil having a quarter-chord defined along a span of said first airfoil, said first airfoil coupled to said hub but uncoupled from said rotational movement of said hub, said first airfoil having a tip,
   a second airfoil having a quarter-chord, said second airfoil coupled to said hub for rotation in direct correspondence to said rotational movement of said hub, said quarter-chord of said first airfoil leading said quarter-chord of said second airfoil when said hub experiences said rotational movement in said defined direction of rotation, said second airfoil having a tip, and
   a connector for coupling said tip of said first airfoil to said tip of said second airfoil.

13. A rotor blade system as in claim 12, wherein said rotor blades are evenly distributed about said hub.

14. A rotor blade system as in claim 12, further comprising a tower adapted to be fixed to the ground surface, said hub being mounted on said tower.

15. A rotor blade system as in claim 12, wherein each said connector comprises a third airfoil.

16. A rotor blade system as in claim 12 wherein, for each of said rotor blades, at least one of said first airfoil and said second airfoil includes a mounting portion for coupling to said hub, wherein each said mounting portion contributes to an airfoil offset defining an amount by which said quarter-chord of said first airfoil leads said quarter-chord of said second airfoil.

17. A rotor blade system as in claim 12, wherein said hub includes a mounting portion for coupling to said first airfoil and said second airfoil associated with each of said rotor blades, wherein said mounting portion contributes to an airfoil offset defining an amount by which said quarter-chord of said first airfoil leads said quarter-chord of said second airfoil for each of said rotor blades.

\* \* \* \* \*